(12) United States Patent
Nakamura et al.

(10) Patent No.: US 12,253,435 B2
(45) Date of Patent: Mar. 18, 2025

(54) POWER TRANSMISSION DEVICE

(71) Applicant: KOMATSU LTD., Tokyo (JP)

(72) Inventors: Manabu Nakamura, Tokyo (JP); Masaya Katou, Tokyo (JP)

(73) Assignee: KOMATSU LTD., Tokyo (JP)

( * ) Notice: Subject to any disclaimer, the term of this patent is extended or adjusted under 35 U.S.C. 154(b) by 367 days.

(21) Appl. No.: 17/788,016

(22) PCT Filed: Jan. 7, 2021

(86) PCT No.: PCT/JP2021/000265
§ 371 (c)(1),
(2) Date: Jun. 22, 2022

(87) PCT Pub. No.: WO2021/176835
PCT Pub. Date: Sep. 10, 2021

(65) Prior Publication Data
US 2023/0026073 A1    Jan. 26, 2023

(30) Foreign Application Priority Data

Mar. 5, 2020 (JP) .................................. 2020-037676

(51) Int. Cl.
*G01M 3/16* (2006.01)
*F16H 57/029* (2012.01)
*F16H 57/02* (2012.01)

(52) U.S. Cl.
CPC ............ *G01M 3/16* (2013.01); *F16H 57/029* (2013.01); *F16H 2057/02043* (2013.01)

(58) Field of Classification Search
CPC ........ G01M 3/026; G01M 3/16; G01M 3/186; F16H 57/029; F16H 2057/02043; F16J 15/3296
See application file for complete search history.

(56) References Cited

U.S. PATENT DOCUMENTS

2003/0015840 A1\* 1/2003 Davis .................. G01M 3/2869
277/320
2009/0026710 A1 1/2009 Hagen et al.
(Continued)

FOREIGN PATENT DOCUMENTS

CA    2 658 641 A1    1/2008
CN    102478084 A     5/2012
(Continued)

OTHER PUBLICATIONS

The International Search Report for the corresponding international application No. PCT/JP2021/000265, issued on Mar. 9, 2021.
(Continued)

*Primary Examiner* — Alexander A Mercado
(74) *Attorney, Agent, or Firm* — GLOBAL IP COUNSELORS, LLP

(57) ABSTRACT

An oil leak detection device includes a pair of permanent magnets, a plurality of commutators, a coil, a pair of brushes, and a current sensor. An N-pole and an S-pole of the pair of permanent magnets face each other. The plurality of commutators are attached to an output shaft. The coil is wound onto the output shaft inside the pair of permanent magnets in the radial direction of the output shaft. The coil is electrically connected to the plurality of commutators. The pair of brushes are attached to a housing and are capable of coming into contact with each of the plurality of commutators. The current sensor detects an induction current flowing between the pair of brushes and the housing.

18 Claims, 7 Drawing Sheets

OUTSIDE ⟵⟶ INSIDE

(56) References Cited

U.S. PATENT DOCUMENTS

| | | | | |
|---|---|---|---|---|
| 2014/0049008 A1* | 2/2014 | Ziegler | ............... | G01M 3/183 |
| | | | | 277/320 |
| 2017/0108399 A1* | 4/2017 | Rhee | ..................... | F16J 15/002 |
| 2017/0167614 A1* | 6/2017 | Baumann | ............. | F16J 15/3296 |
| 2021/0296965 A1* | 9/2021 | Su | ......................... | H02K 9/193 |
| 2023/0280232 A1* | 9/2023 | Cao | ...................... | G01M 3/186 |
| | | | | 73/40 |
| 2023/0349786 A1* | 11/2023 | Cao | ....................... | B25J 9/1674 |

FOREIGN PATENT DOCUMENTS

| | | | |
|---|---|---|---|
| CN | 109115431 | A | 1/2019 |
| CN | 109863078 | A | 6/2019 |
| JP | 62-298737 | A | 12/1987 |
| JP | 63-128320 | U | 8/1988 |
| JP | 2011-214593 | A | 10/2011 |
| WO | 2008/120399 | A1 | 10/2008 |
| WO | 2016/143088 | A1 | 9/2016 |

OTHER PUBLICATIONS

The extended European search report for the corresponding European application No. 21763490.6, issued Dec. 20, 2022.
The Office Action for the corresponding Chinese application No. 202180007241.7, issued on Jan. 17, 2025.
Zhang Gaili, Mercedes-Benz 9G-TRONIC Automatic Transmission Description (Part I). For Repair & Maintenance, Dec. 2014, published by China North Vehicle Research Institute; Page Nos. 52, 54 and 55.

* cited by examiner

POWER TRANSMISSION DEVICE

CROSS-REFERENCE TO RELATED APPLICATIONS

This application is a U.S. National stage application of International Application No. PCT/JP2021/000265, filed on Jan. 7, 2021. This U.S. National stage application claims priority under 35 U.S.C. § 119(a) to Japanese Patent Application No. 2020-037676, filed in Japan on Mar. 5, 2020, the entire contents of which are hereby incorporated herein by reference.

BACKGROUND

Technical Field

The present disclosure relates to a power transmission device.

BACKGROUND INFORMATION

In a conventional work vehicle, a seal is provided so that oil inside a housing of a power transmission device does not leak out from a gap between the housing and a rotating shaft. The power transmission device is, for example, a transmission or an axle. The rotating shaft is, for example, an output shaft or an input shaft rotatably supported by the housing.

In Laid-Open Utility Specification No. 63-128320, a seal has a labyrinth structure configured by inserting together a plurality of fixed-side ring elements attached to the housing and a plurality of rotation-side ring elements attached to the output shaft.

SUMMARY

However, it is important to quickly detect the occurrence of an oil leakage because it is difficult to completely prevent an oil leak from a gap between a housing and a rotating shaft.

An object of the present disclosure is to provide a power transmission device with which the occurrence of an oil leak can be detected quickly.

A power transmission device according to the present disclosure comprises a rotating shaft, a housing that rotatably supports the rotating shaft, an oil seal disposed in a gap between the rotating shaft and the housing, and an oil leak detection device disposed outside of the oil seal in an axial direction parallel to an axial center of the rotating shaft. The oil leak detection device has a pair of permanent magnets with an N-pole and an S-pole facing each other, a plurality of commutators, a coil, a pair of brushes, and a current sensor. The pair of permanent magnets are attached to the housing. The plurality of commutators are attached to the rotating shaft. The coil is wound onto the rotating shaft on an inside of the pair of permanent magnets in a radial direction centered on the axial center of the rotating shaft, and is electrically connected to the plurality of commutators. The pair of brushes are attached to the housing and are capable of coming into contact with each of the plurality of commutators. The current sensor is configured to detect an induction current flowing between the pair of brushes and the housing.

According to the present disclosure, there can be provided a power transmission device with which the occurrence of an oil leak can be detected quickly.

DESCRIPTION OF EMBODIMENTS (Configuration of Wheel Loader 1)

Figure 1:
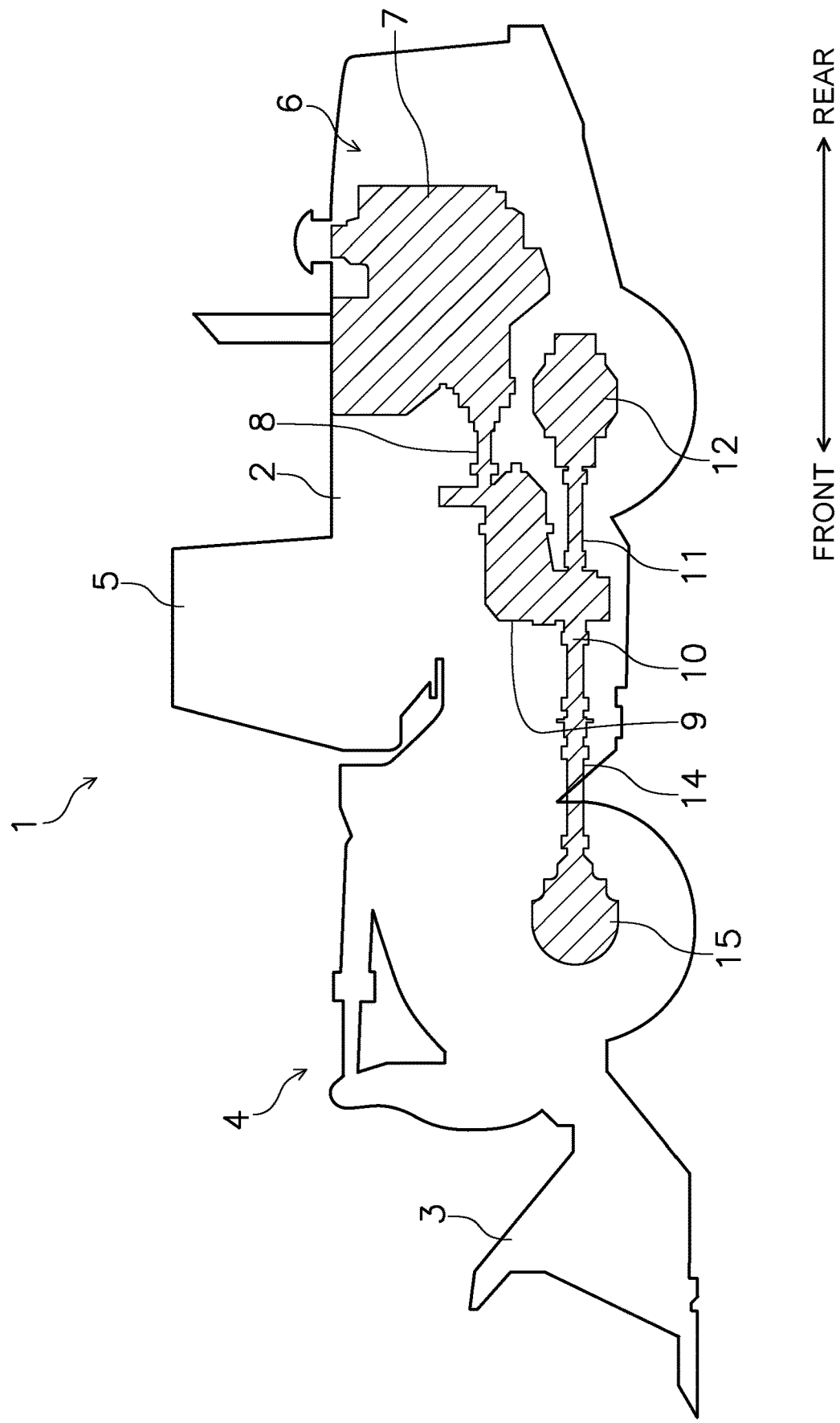
FIG. 1 is a side view of a wheel loader according to an embodiment.

FIG. 1 is a side view of a wheel loader 1 according to the present embodiment. A power transmission system of the wheel loader 1 is illustrated schematically in FIG. 1. In the following discussion, "front" and "rear" are the same as "front" and "rear" as seen by an operator seated in the driver's seat.

The wheel loader 1 comprises a vehicle body 2, a bucket 3, a work implement drive mechanism 4, and a cab 5. The vehicle body 2 has a front vehicle body and a rear vehicle body. The bucket 3 used for excavating and loading is attached to the front of the vehicle body 2 via the hydraulic work implement drive mechanism 4. The work implement drive mechanism 4 is configured by a boom, a bell crank, a coupling link, a bucket cylinder, a boom cylinder, and the like.

The box-like cab 5 in which the operator rides is disposed on the vehicle body 2. An engine room 6 is provided to a rear end section of the vehicle body 2. An engine 7 that is a power source is accommodated inside the engine room 6. In the present embodiment, a crankshaft (not illustrated) of the engine 7 is disposed in the front-back direction.

Power of the engine 7 is transmitted to a transmission 9 via a propeller shaft 8. A portion of the power outputted by the transmission 9 is transmitted to a rear drive shaft 11 via an output shaft 10. The power transmitted to the rear drive shaft 11 is transmitted to the rear wheels via a rear axle 12. A portion of the power outputted by the transmission 9 is transmitted to a front drive shaft 14 via the output shaft 10. The power transmitted to the front drive shaft 14 is transmitted to the front wheels via a front axle 15.

In the present embodiment, the transmission 9, the output shaft 10, the rear drive shaft 11, the rear axle 12, the front drive shaft 14, and the front axle 15 configure the "power transmission device" according to the present embodiment.

(Configuration of Transmission 9)

Figure 2:
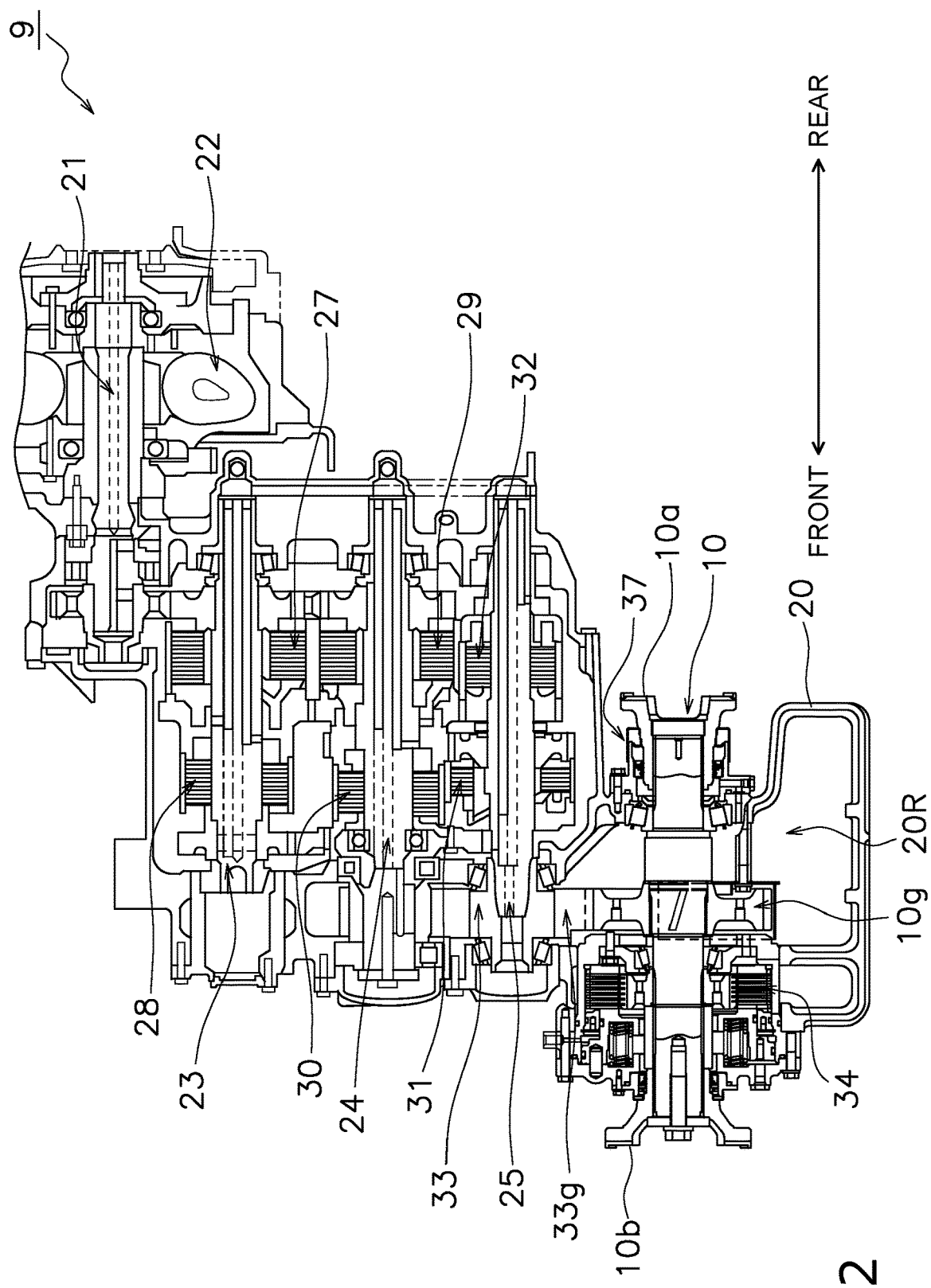
FIG. 2 is a cross-sectional view of a transmission according to the embodiment.
Figure 3:
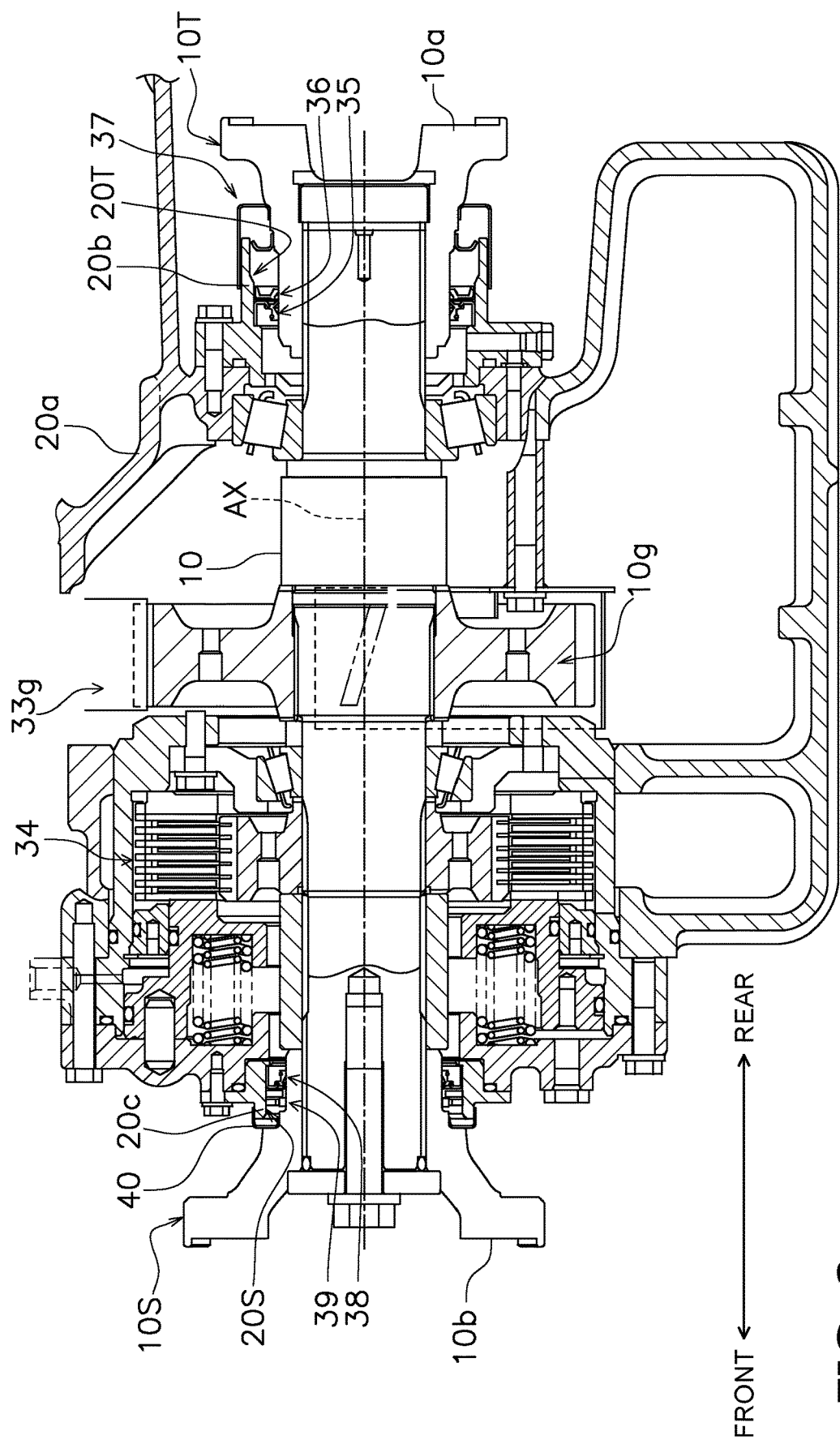
FIG. 3 is an enlarged view of a portion of FIG. 2.

FIG. 2 is a cross-sectional view of a configuration of the entire transmission 9 according to the present embodiment. FIG. 3 is an enlarged view of a portion of FIG. 2.

The transmission 9 comprises a housing 20, an input shaft 21, a torque converter 22, a first middle shaft 23, a second middle shaft 24, a third middle shaft 25, and the output shaft 10. The input shaft 21, the torque converter 22, the first middle shaft 23, the second middle shaft 24, the third middle shaft 25, and the output shaft 10 transmit the power from the engine 7.

The housing 20 accommodates the input shaft 21, the torque converter 22, the first middle shaft 23, the second middle shaft 24, the third middle shaft 25, and the output shaft 10. The inside of the housing 20 has formed therein an internal space 20R that accommodates the input shaft 21, the torque converter 22, the first middle shaft 23, the second middle shaft 24, the third middle shaft 25, and the output shaft 10. Oil for lubrication is sealed inside the internal space 20R. The housing 20 is configured by a conductive material such as a metal. The housing 20 is an example of the "housing" according to the present embodiment. The output shaft 10 is an example of the "rotating shaft" according to the present embodiment.

Power from the engine 7 is inputted to the input shaft 21 via the torque converter 22. An F-clutch 27 and a first clutch 28 are provided to the first middle shaft 23. An R-clutch 29 and a second clutch 30 are provided to the second middle shaft 24. A third clutch 31 and a fourth clutch 32 are provided to the third middle shaft 25. A transfer shaft 33 is coupled to a front end section of the third middle shaft 25. A transfer gear 33g is provided to the transfer shaft 33.

Power from the transfer shaft 33 is transmitted to the output shaft 10. An output gear 10g that meshes with the transfer gear 33g, and a parking brake 34 are provided to the output shaft 10.

The output shaft 10 is disposed in the front-back direction. A rear end section of the output shaft 10 protrudes from the housing 20 toward the rear. A front end section of the output shaft 10 protrudes from the housing 20 toward the front. As illustrated in FIG. 3, the output shaft 10 is supported by the housing 20. The output shaft 10 is rotatable about an axial center AX.

As illustrated in FIG. 3, the output shaft 10 has a rear coupling section 10a and a front coupling section 10b. The rear coupling section 10a is connected to a front end section of the rear drive shaft 11. The front coupling section 10b is connected to a rear end section of the front drive shaft 14.

As illustrated in FIG. 3, the housing 20 has a housing body 20a, a rearward protruding section 20b, and a forward protruding section 20c (example of a "protruding section"). The housing body 20a accommodates an axial direction center section of the output shaft 10. The axial direction is a direction parallel to the axial center AX of the output shaft 10. The rearward protruding section 20b protrudes to the rear from the housing body 20a. The rearward protruding section 20b is formed in an annular shape centered on the axial center AX. The forward protruding section 20c protrudes to the front from the housing body 20a. The forward protruding section 20c is formed in an annular shape centered on the axial center AX.

A rearward oil seal 35 and a rearward dust seal 36 are disposed in a gap between the rear coupling section 10a of the output shaft 10 and the rearward protruding section 20b of the housing 20.

The rearward oil seal 35 seals oil inside the housing 20. The rearward oil seal 35 is in contact with a surface 10T of the rear coupling section 10a of the rotating shaft 10 and a surface 20T of the rearward protruding section 20b of the housing 20. The rearward oil seal 35 is fixed to the surface 20T of the housing 20. The rearward oil seal 35 may be fixed also to the surface 10T of the rotating shaft 10. The rearward oil seal 35 is disposed on the axial outward side of the housing 20. The rearward oil seal 35 is formed in an annular shape centered on the axial center AX. A well-known oil seal may be used for the rearward oil seal 35.

In the present embodiment, the axial outward side signifies the rearward protruding section 20b side or the forward protruding section 20c side with respect to the internal space 20R of the housing 20 in the axial direction. Additionally, in the present embodiment, the axial inward side signifies the internal space 20R side of the housing 20 with respect to the rearward protruding section 20b side or the forward protruding section 20c side in the axial direction.

The rearward dust seal 36 limits the intrusion to the rearward oil seal 35 side of foreign matter that has intruded into the gap between the output shaft 10 and the rearward protruding section 20b of the housing 20 from the outside. The rearward dust seal 36 is in contact with the surface 10T of the rear coupling section 10a of the rotating shaft 10 and the surface 20T of the rearward protruding section 20b of the housing 20. The rearward dust seal 36 is disposed on the axial outward side of the rearward oil seal 35. The rearward dust seal 36 is formed in an annular shape centered on the axial center AX. A well-known dust seal may be used for the rearward dust seal 36.

An annular seal cover 37 for covering the axial outward side of the rearward dust seal 36 is attached to the output shaft 10. The seal cover 37 limits the intrusion of earth and sand or muddy water or the like (referred to below as "foreign matter") into the gap between the output shaft 10 and the rearward protruding section 20b of the housing 20.

A forward oil seal 38 and an oil leak detection device 39 are disposed in the gap between the front coupling section 10b of the output shaft 10 and the forward protruding section 20c of the housing 20.

The forward oil seal 38 seals oil inside the housing 20. The forward oil seal 38 is in contact with a surface 10S of the front coupling section 10b of the rotating shaft 10 and a surface 20S of the forward protruding section 20c of the housing 20. The forward oil seal 38 is fixed to the surface 20S of the housing 20. The forward oil seal 38 may be fixed also to the surface 10S of the rotating shaft 10. The forward oil seal 38 is disposed on the axial outward side of the housing 20. The forward oil seal 38 is formed in an annular shape centered on the axial center AX. A well-known oil seal may be used for the forward oil seal 38.

The oil leak detection device 39 detects an oil leak from the forward oil seal 38. The oil leak detection device 39 is disposed on the axial outward side of the forward oil seal 38. A configuration of the oil leak detection device 39 is explained below.

An annular seal cover 40 for covering the axial outward side of the oil leak detection device 39 is attached to the output shaft 10. The seal cover 40 limits the intrusion of foreign matter into the gap between the output shaft 10 and the forward protruding section 20c of the housing 20.

(Oil Leak Detection Device 39)

Figure 4:
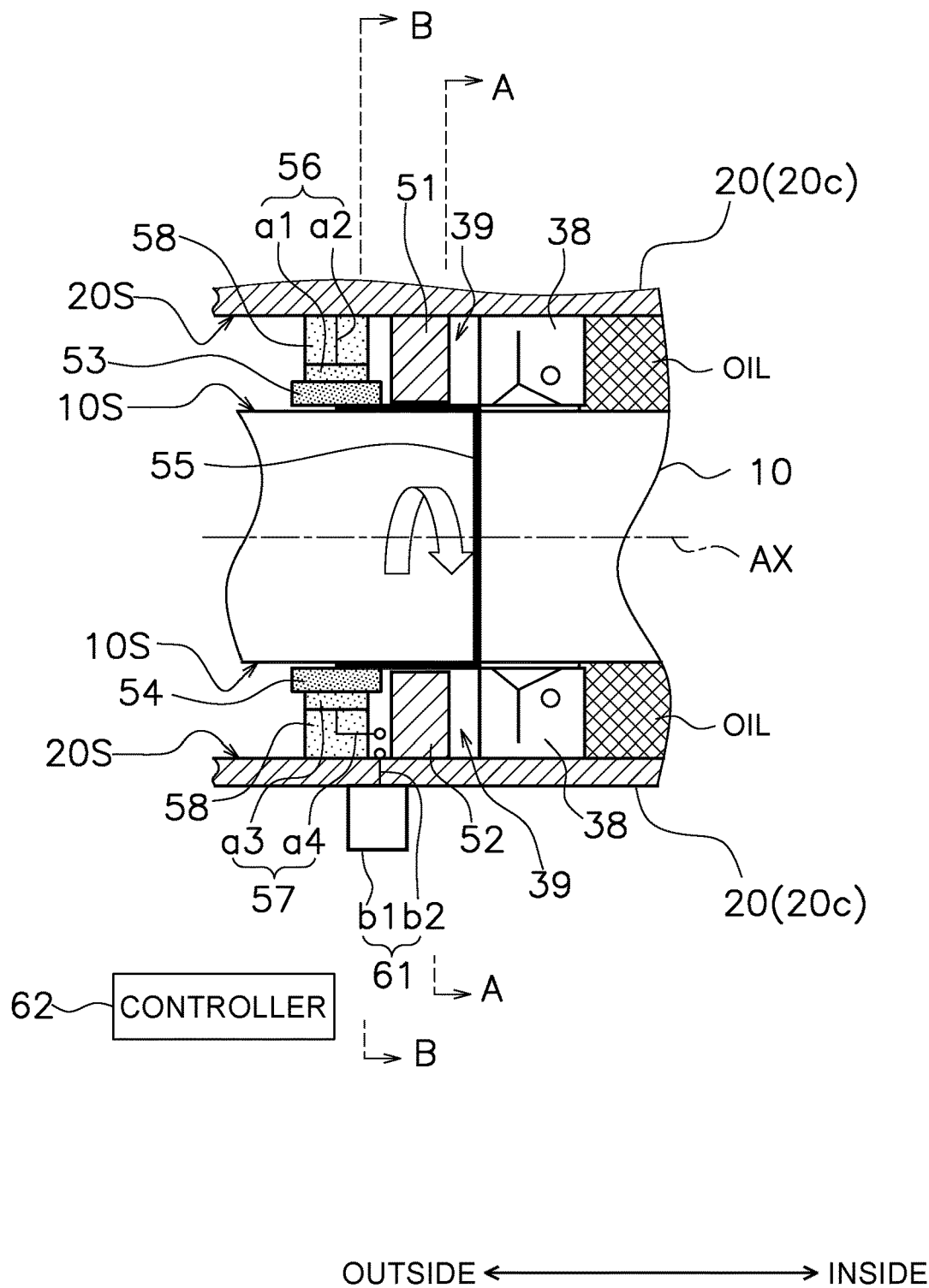
FIG. 4 is an enlarged view of a portion of FIG. 3.
Figure 5:
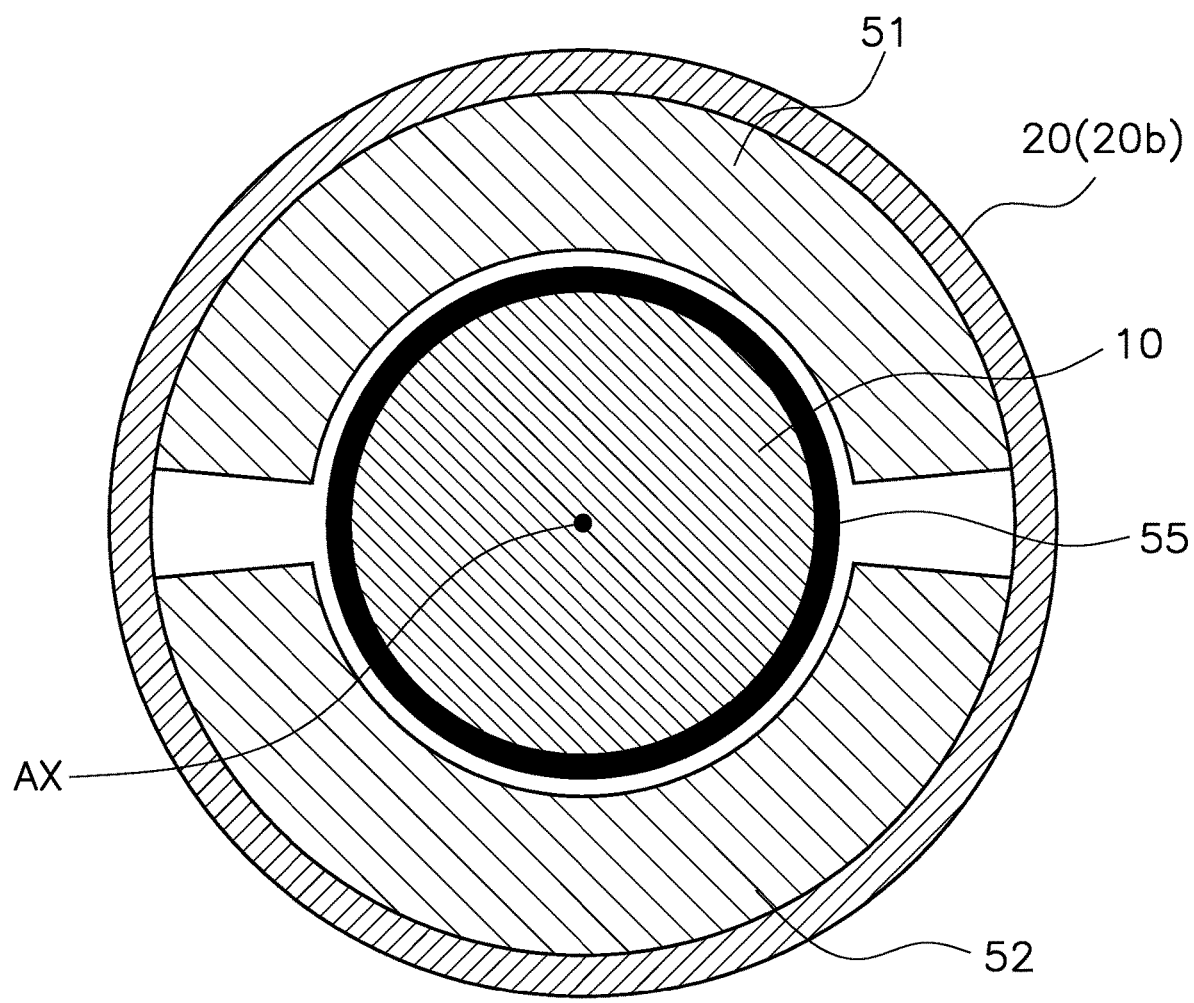
FIG. 5 is a sectional view along line A-A in FIG. 4.
Figure 6:
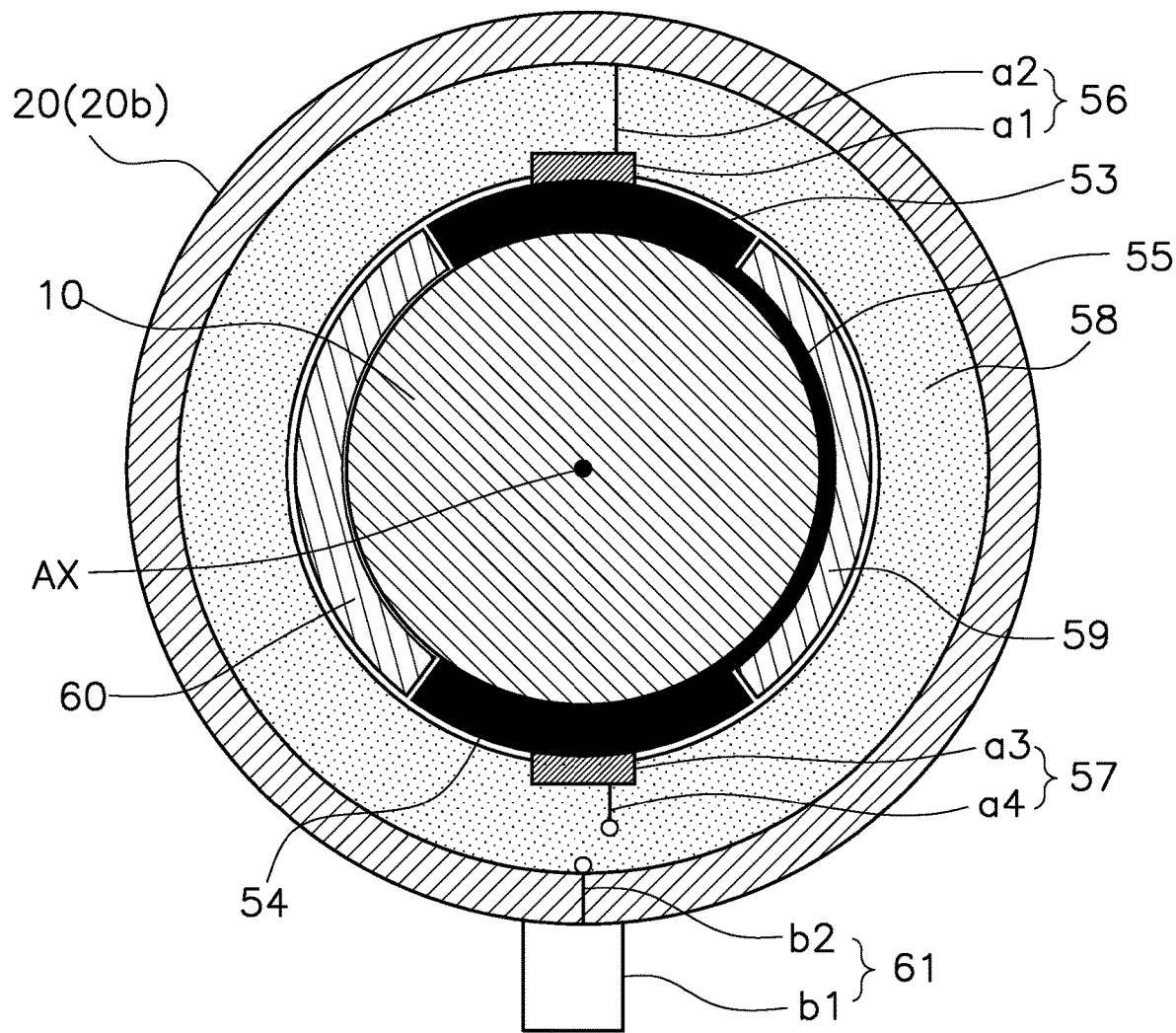
FIG. 6 is a sectional view along line B-B in FIG. 4.
Figure 7:
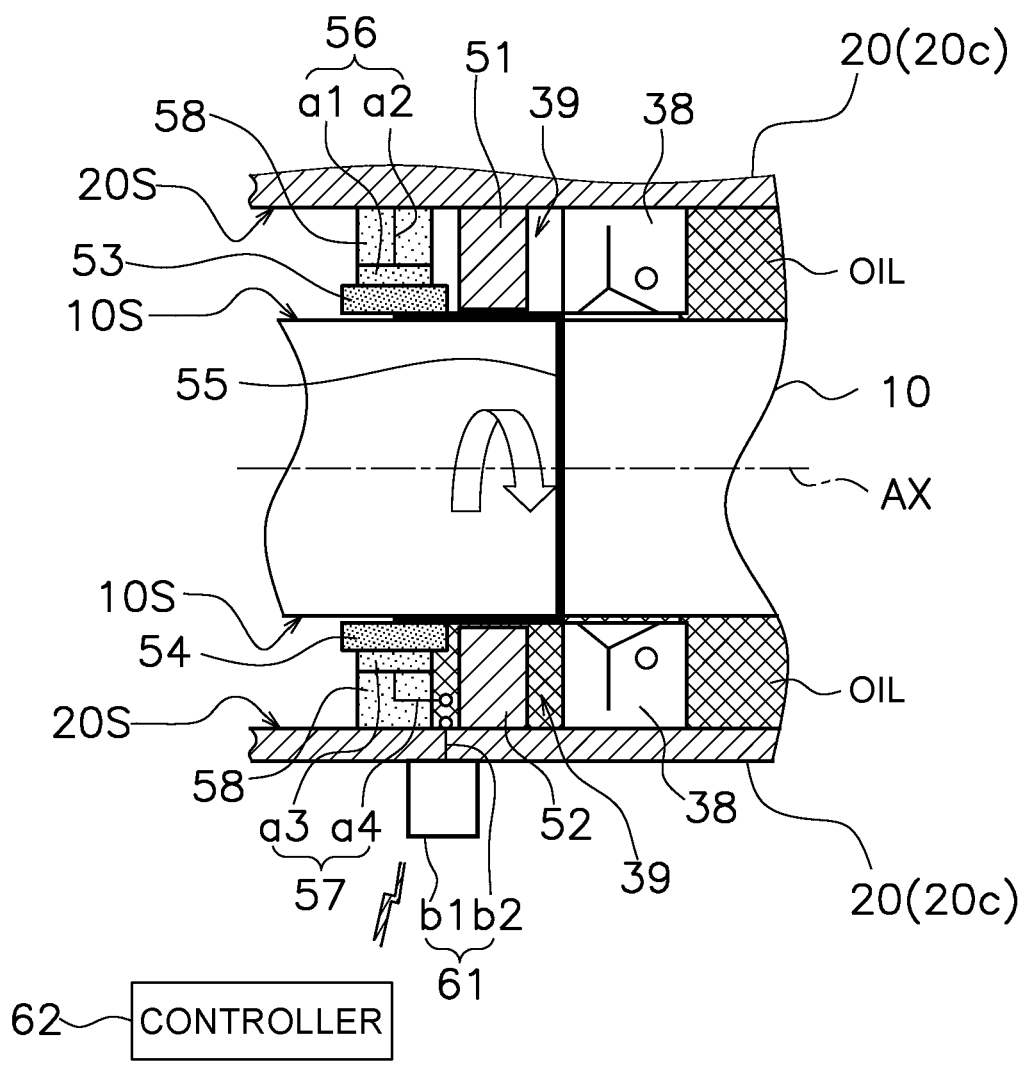
FIG. 7 is a schematic view illustrating a state in which an oil leak has occurred.

FIG. 4 is an enlarged view of a portion of FIG. 3. The forward oil seal 38 and the oil leak detection device 39 are mainly illustrated in FIG. 4. FIG. 5 is cross-sectional view along line A-A in FIG. 4. FIG. 6 is a cross-sectional view along line B-B in FIG. 4. FIG. 7 is a schematic view corresponding to FIG. 4 and illustrates a state in which an oil leak from the forward oil seal 38 has occurred.

The oil leak detection device 39 has: a pair of permanent magnets 51, 52; a plurality of commutators 53, 54; a coil 55; a pair of brushes 56, 57; an oil absorbing material 58; dummy commutators 59, 60; a current sensor 61; and a controller 62.

The pair of permanent magnets 51, 52 are attached to the surface 20S of the forward protruding section 20c within the housing 20. The pair of permanent magnets 51, 52 are disposed so that an N-pole and an S-pole face each other. Specifically, the pair of permanent magnets 51, 52 include an N-pole magnet 51 and an S-pole magnet 52 that face each other with the output shaft 10 interposed therebetween. The N-pole magnet 51 and the S-pole magnet 52 are separated from each other in the circumferential direction centered on the axial center AX.

In the present embodiment, the pair of permanent magnets 51, 52 are disposed on the axial inward side of the plurality of commutators 53, 54; however, the pair of permanent magnets 51, 52 may be disposed on the axial outward side of the plurality of commutators 53, 54.

The plurality of commutators 53, 54 are attached to the surface 10S of the rotating shaft 10. The plurality of commutators 53, 54 face each other with the output shaft 10 interposed therebetween. The plurality of commutators 53, 54 are separated from each other in the circumferential direction centered on the axial center AX. The plurality of commutators 53, 54 rotate with the rotating shaft 10 around the axial center AX. The plurality of commutators 53, 54 that rotate are periodically in contact with the pair of brushes 56, 57.

The coil 55 is electrically connected to the plurality of commutators 53, 54. In the present embodiment, both ends of the coil 55 are respectively connected to the plurality of commutators 53, 54. The coil 55 is disposed on the inside of the pair of permanent magnets 51, 52 in the radial direction centered on the axial center AX. The coil 55 is wound onto the rotating shaft 10 on the inside of the pair of permanent magnets 51, 52. The number of windings of the coil 55 may be one or more.

The coil 55 rotates with the rotating shaft 10 around the axial center AX between the pair of permanent magnets 51, 52. An induced voltage is produced by electromagnetic induction on the rotating coil 55. However, while the induced voltage is produced constantly if the coil 55 is rotating, as explained below, a loop circuit in which the induction current flows is not formed so long as there is no oil leak.

In the present embodiment, because the pair of permanent magnets 51, 52 are disposed on the axial inward side of the plurality of commutators 53, 54, the coil 55 is also disposed on the axial inward side of the plurality of commutators 53, 54. However, when the pair of permanent magnets 51, 52 are disposed on the axial outward side of the plurality of commutators 53, 54, the coil 55 is also disposed on the axial outward side of the plurality of commutators 53, 54.

The pair of brushes 56, 57 are attached to the surface 20S of the housing 20. The pair of brushes 56, 57 face each other with the output shaft 10 interposed therebetween. The pair of brushes 56, 57 are separated from each other in the circumferential direction centered on the axial center AX. The pair of brushes 56, 57 include a first brush 56 connected to the housing 20 and a second brush 57 separated from the housing 20. The first brush 56 is disposed above the rotating shaft 10. The second brush 57 is disposed below the rotating shaft 10. The first brush 56 is disposed above the axial center AX. The second brush 57 is disposed below the axial center AX. The pair of brushes 56, 57 are periodically in contact with the plurality of commutators 53, 54 that rotate.

In the present embodiment, the pair of brushes 56, 57 are supported by the oil absorbing material 58. Therefore, the pair of brushes 56, 57 are attached to the surface 20S of the housing 20 through the oil absorbing material 58.

In the present embodiment, the first brush 56 has a brush body a1 and a conductor a2. The brush body a1 is attached to the oil absorbing material 58. The conductor a2 is connected to the brush body a1 and the housing 20. The conductor a2 is configured by an electrically conductive material. The conductor a2 is electrically connected to the brush body a1 and the housing 20.

In the present embodiment, the second brush 57 has a brush body a3 and a terminal part a4. The brush body a3 is attached to the oil absorbing material 58. The terminal part a4 extends from the brush body a3 toward the surface 20S of the housing 20. The tip end of the terminal part a4 preferably extends close to the surface 20S of the housing 20. The tip end of the terminal part a4 preferably extends close to the tip end of a below-mentioned terminal part b2 of the current sensor 61.

The oil absorbing material 58 is attached to the surface 20S of the housing 20. The oil absorbing material 58 is disposed in a gap between the surface 20S of the housing 20 and the plurality of commutators 53, 54. The oil absorbing material 58 absorbs oil that has leaked from the forward oil seal 38. The oil absorbing material 58 is configured by a material that has oil absorbency and insulative properties. For example, felt (non-woven fabric) is suitable for such a material.

In the present embodiment, the oil absorbing material 58 functions as a supporting member of the pair of brushes 56, 57. In addition, the oil absorbing material 58 functions as a dust seal. Specifically, the oil absorbing material 58 limits the intrusion, toward the forward oil seal 38, of foreign matter that has intruded into the gap between the rear coupling section 10a of the output shaft 10 and the forward protruding section 20c of the housing 20.

The dummy commutators 59, 60 are each disposed in a gap between the plurality of commutators 53, 54 in the circumferential direction centered on the axial center AX. The dummy commutators 59, 60 limit the intrusion of foreign matter on the axial inward side of the oil leak detection device 39. The dummy commutators 59, 60 face each other with the output shaft 10 interposed therebetween. The dummy commutators 59, 60 are separated from each other in the circumferential direction centered on the axial center AX. The dummy commutators 59, 60 are configured by a material having an insulative property. For example, rubber or felt may be used as such a material. When the dummy commutators 59, 60 are configured by felt, the dummy commutators 59, 60 may be integrated with the oil absorbing material 58.

The current sensor 61 detects an induction current flowing between the pair of brushes 56, 57 and the forward protruding section 20c of the housing 20 as indicated below. Firstly, as illustrated in FIG. 7, when an oil leak occurs from the forward oil seal 38 and oil becomes interposed between the second brush 57 and the housing 20, the second brush 57 and the housing 20 are electrically connected by the oil. As a result, a loop circuit is formed by the plurality of commutators 53, 54, the coil 55, the pair of brushes 56, 57, and the housing 20 and an induction current caused by the induced voltage occurring in the coil 55 flows through the loop circuit. The current sensor 61 is activated by the induction current flowing through the loop circuit and detects that an induction current is flowing. The current sensor 61 wirelessly notifies the controller 62 that an induction current has been detected.

In the present embodiment, the current sensor 61 has a sensor body b1 and the terminal part b2. The sensor body b1 is disposed outside the housing 20. The terminal part b2 passes through the housing 20 and extends from the sensor body b1 to the gap between the output shaft 10 and the housing 20. The tip end of the terminal part b2 preferably extends close to the surface 20S of the housing 20. The tip end of the terminal part b2 preferably close to the tip end of the terminal part a4 of the second brush 57.

The controller 62 is disposed, for example, in the cab 5. The controller 62 issues a warning (warning sound, warning display, etc.) to a worker upon receiving the notification from the current sensor 61 indicating that an induction current has been detected.

The transmission 9 comprises the output shaft 10, the housing 20, the forward oil seal 38, and the oil leak detection device 39. The housing 20 rotatably supports the output shaft 10. The forward oil seal 38 is disposed in a gap between the output shaft 10 and the housing 20. The oil leak detection device 39 is disposed on the axial outward side of the forward oil seal 38. The oil leak detection device 39 has: the pair of permanent magnets 51, 52; the plurality of commutators 53, 54; the coil 55; the pair of brushes 56, 57; and the current sensor 61. The N-pole and the S-pole of the pair of permanent magnets 51, 52 face each other. The plurality of commutators 53, 54 are attached to the output shaft 10. The coil 55 is wound around the output shaft 10 inside the pair of permanent magnets 51, 52 in the radial direction of the output shaft 10. The coil 55 is electrically connected to the plurality of commutators 53, 54. The pair of brushes 56, 57 are attached to the housing 20 and are able to come into contact with each of the plurality of commutators 53, 54. The current sensor 61 detects an induction current flowing between the pair of brushes 56, 57 and the housing 20.

Therefore, the current sensor 61 detects the induction current flowing through the loop circuit formed by the plurality of commutators 53, 54, the coil 55, the pair of brushes 56, 57, and the housing 20 when an oil leak from the forward oil seal 38 occurs and the second brush 57 and the housing 20 are electrically connected by the oil. Accordingly, the occurrence of the oil leak can be detected quickly.

The pair of brushes 56, 57 include the first brush 56 connected to the housing 20 and the second brush 57 separated from the housing 20. The second brush 57 has the brush body a3 and the terminal part a4 that extends from the brush body a3 toward the housing 20. Accordingly, the loop circuit can be formed quickly by oil that has leaked along the surface 20S of the housing 20 coming into contact with the second brush 57.

The first brush 56 is disposed above the output shaft 10 and the second brush 57 is disposed below the output shaft 10. Accordingly, the second brush 57 is able to quickly make contact with the oil that has leaked along a lower part of the surface 20S of the housing 20.

The current sensor 61 has the sensor body b1 that is disposed outside of the housing 20, and the terminal part b2 that extends from the sensor body b1 to the inside of the housing 20. Accordingly, the current sensor 61 is able to quickly make contact with the oil that has leaked along the surface 20S of the housing 20.

The current sensor 61 is activated by the induction current flowing between the pair of brushes and the housing. Accordingly, the configuration of the oil leak detection device 39 is further simplified because there is no need for a power source for the current sensor 61.

The current sensor 61 wirelessly notifies the controller 62 that an induction current has been detected. Accordingly, the configuration of the oil leak detection device 39 can be further simplified in comparison to when the current sensor 61 and the controller 62 are connected by wire.

The pair of brushes 56, 57 are attached to the housing 20 via the insulative oil absorbing material 58. Accordingly, delaying of the oil leak and the intrusion of foreign matter from the outside through the gap between the plurality of commutators 53, 54 and the housing 20 can be suppressed.

The oil leak detection device 39 has the dummy commutators 59, 60 that are each disposed in a gap between the plurality of commutators 53, 54 in the circumferential direction centered on the axial center AX. Accordingly, the intrusion of foreign matter from the outside through the gap between the plurality of commutators 53, 54 can be suppressed.

The present invention is not limited to the above embodiment and various changes and modifications may be made without departing from the spirit of the invention.

While the oil seal and the oil leak detection device according to the present disclosure apply to the gap between the output shaft 10 and the housing 20 of the transmission 9 in the above embodiment, the present disclosure is not limited in this way. The oil seal and the oil leak detection device according to the present disclosure may also be applied to a gap between the input shaft 21 and the housing 20 of the transmission 9, a gap between the rear drive shaft 11 and the housing of the rear axle 12, a gap between the front drive shaft 14 and the housing of the front axle 15, and the like.

While the second brush 57 has the brush body a3 and the terminal part a4 in the above embodiment, the second brush 57 may not have the terminal part a4.

While the current sensor 61 has the sensor body b1 and the terminal part b2 in the above embodiment, the current sensor 61 may not have the terminal part b2. Even is such a case, the current sensor 61 can detect a current flowing through the housing 20 itself.

The invention claimed is:

1. A power transmission device comprising:
a rotating shaft;
a housing rotatably supporting the rotating shaft;
an oil seal disposed in a gap between the rotating shaft and the housing; and
an oil leak detection device disposed outside of the oil seal in an axial direction parallel to an axial center of the rotating shaft,
the oil leak detection device including
a pair of permanent magnets attached to the housing and having an N-pole and an S-pole that face each other;
a plurality of commutators attached to the rotating shaft;
a coil wound onto the rotating shaft on an inside of the pair of permanent magnets in a radial direction centered on the axial center of the rotating shaft, and electrically connected to the plurality of commutators;
a pair of brushes attached to the housing and configured to contact each of the plurality of commutators; and
a current sensor configured to detect an induction current flowing between the pair of brushes and the housing.

2. The power transmission device according to claim 1, wherein
the pair of brushes include a first brush connected to the housing, and a second brush separated from the housing, and
the second brush has a brush body and a terminal part that extends from the brush body toward the housing.

3. The power transmission device according to claim 2, wherein
the first brush is disposed above the rotating shaft, and the second brush is disposed below the rotating shaft.

4. The power transmission device according to claim 3, wherein the current sensor has a sensor body disposed outside of the housing and a terminal part that extends from the sensor body to the gap.

5. The power transmission device according to claim 4, wherein
the current sensor is activated by the induction current.

6. The power transmission device according to claim 5, wherein
the current sensor wirelessly notifies a controller that the induction current has been detected.

7. The power transmission device according to claim 6, wherein
the pair of brushes are attached to the housing through an insulative oil absorbing material.

8. The power transmission device according to claim 7, wherein
the oil leak detection device has a dummy commutator disposed in a gap between the plurality of commutators in a circumferential direction centered on the axial center.

9. The power transmission device according to claim 2, wherein
the current sensor has a sensor body disposed outside of the housing and a terminal part that extends from the sensor body to the gap.

10. The power transmission device according to claim 9, wherein
the current sensor is activated by the induction current.

11. The power transmission device according to claim 10, wherein
the current sensor wirelessly notifies a controller that the induction current has been detected.

12. The power transmission device according to claim 11, wherein
the pair of brushes are attached to the housing through an insulative oil absorbing material.

13. The power transmission device according to claim 12, wherein
the oil leak detection device has a dummy commutator disposed in a gap between the plurality of commutators in a circumferential direction centered on the axial center.

14. The power transmission device according to claim 1, wherein
the current sensor has a sensor body disposed outside of the housing and a terminal part that extends from the sensor body to the gap.

15. The power transmission device according to claim 1, wherein
the current sensor is activated by the induction current.

16. The power transmission device according to claim 1, wherein
the current sensor wirelessly notifies a controller that the induction current has been detected.

17. The power transmission device according to claim 1, wherein
the pair of brushes are attached to the housing through an insulative oil absorbing material.

18. The power transmission device according to claim 1, wherein
the oil leak detection device has a dummy commutator disposed in a gap between the plurality of commutators in a circumferential direction centered on the axial center.

* * * * *